(12) United States Patent
Suteerawanit

(10) Patent No.: US 11,771,256 B1
(45) Date of Patent: Oct. 3, 2023

(54) SERRATED JACKFRUIT KNIFE

(71) Applicant: Nick Suteerawanit, Los Angeles, CA (US)

(72) Inventor: Nick Suteerawanit, Los Angeles, CA (US)

(*) Notice: Subject to any disclaimer, the term of this patent is extended or adjusted under 35 U.S.C. 154(b) by 0 days.

(21) Appl. No.: 18/080,596

(22) Filed: Dec. 13, 2022

(51) Int. Cl.
*A47J 25/00* (2006.01)
*B26B 9/02* (2006.01)

(52) U.S. Cl.
CPC ............ *A47J 25/00* (2013.01); *B26B 9/02* (2013.01)

(58) Field of Classification Search
CPC .................................. A47J 25/00; B26B 9/02
See application file for complete search history.

(56) References Cited

U.S. PATENT DOCUMENTS

| | | | | |
|---|---|---|---|---|
| 129,933 A * | 7/1872 | Clarkson | A01G 23/12 | 30/317 |
| 379,286 A * | 3/1888 | Runnels | A61B 17/3211 | 606/175 |
| 695,353 A * | 3/1902 | Turner | A01G 23/12 | 81/177.85 |
| 826,266 A | 7/1906 | Newman | | |
| 1,018,073 A * | 2/1912 | Nelson | A01G 3/06 | 30/280 |
| 1,051,526 A * | 1/1913 | Thomas | B27G 17/04 | 30/313 |
| 1,108,651 A * | 8/1914 | Worcester | A01G 23/12 | 30/317 |
| 1,261,689 A * | 4/1918 | Bristle | A01G 23/12 | 452/104 |
| 1,818,398 A * | 8/1931 | Huxford | A01G 20/30 | 30/317 |
| 1,888,243 A * | 11/1932 | Smith | A01G 23/12 | 30/317 |
| 2,032,562 A * | 3/1936 | Burns | A47J 25/00 | 30/316 |
| 2,309,814 A * | 2/1943 | Youngberg | B26B 9/02 | D7/693 |
| 2,321,725 A * | 6/1943 | Alderfer | A47G 21/00 | 99/538 |
| 2,333,736 A * | 11/1943 | Overbey | A47J 17/02 | D7/649 |
| 2,335,013 A * | 11/1943 | Kennett | A47J 17/04 | 30/304 |
| D140,193 S * | 1/1945 | Lynn | D7/696 | |
| 2,504,557 A * | 4/1950 | Lumian | A61C 17/08 | 433/96 |
| 3,357,469 A * | 12/1967 | Pease | B26D 1/29 | 83/418 |
| 3,387,366 A * | 6/1968 | Whitman | B65B 69/0033 | 30/294 |

(Continued)

FOREIGN PATENT DOCUMENTS

CN 214316930 U 10/2021

*Primary Examiner* — Sean M Michalski
(74) *Attorney, Agent, or Firm* — Averill, Green & Kim; Philip Y Kim; Kenneth L Green

(57) ABSTRACT

A jackfruit knife has a blade with generally parallel sides connected at a rounded end. Serrations are present on opposite edges of the blade sides and the rounded end. The blade may be attached to a handle for manual operation, or to an oscillating tool. The motion provided by the oscillating tool reduces or prevents the blade from sticking while cutting into the jackfruit core.

18 Claims, 6 Drawing Sheets

(56) References Cited

U.S. PATENT DOCUMENTS

| | | | | |
|---|---|---|---|---|
| 3,555,678 A * | 1/1971 | Agulnick et al. | | B26B 7/00 D7/646 |
| 3,605,178 A * | 9/1971 | Hoffmann | | A22C 17/12 30/313 |
| 3,861,036 A * | 1/1975 | Eichhorn | | A47G 19/28 30/123.6 |
| 3,892,039 A * | 7/1975 | Fisher | | E04F 21/0084 30/280 |
| 4,202,095 A * | 5/1980 | Gingras | | B26B 3/02 30/340 |
| 4,345,516 A * | 8/1982 | Sinclair | | A47J 43/288 D7/672 |
| 4,383,367 A * | 5/1983 | Mielnicki | | A47J 17/02 30/280 |
| 4,571,832 A * | 2/1986 | Hendy | | B26B 3/03 30/283 |
| 4,593,466 A * | 6/1986 | O'Brien | | B26B 7/005 30/296.1 |
| 4,711,030 A * | 12/1987 | Ruston, Sr. | | B26B 7/005 30/DIG. 1 |
| 4,739,557 A * | 4/1988 | Wagner | | B23D 51/10 30/392 |
| 4,763,414 A * | 8/1988 | McNeill, II | | A47J 25/00 99/638 |
| 4,967,477 A * | 11/1990 | Sanford | | B26B 27/00 30/314 |
| 4,998,348 A * | 3/1991 | Foate | | B26B 3/04 30/305 |
| 5,257,457 A * | 11/1993 | Cotter | | A01G 23/099 30/280 |
| 5,613,431 A * | 3/1997 | Tateno | | A47J 17/02 83/437.1 |
| 5,846,244 A * | 12/1998 | Cripe | | A61B 17/142 606/171 |
| 5,920,991 A * | 7/1999 | Tracy | | B26B 3/00 30/294 |
| 5,937,524 A * | 8/1999 | Hornsby | | B26B 3/00 30/313 |
| 5,983,499 A * | 11/1999 | Andrews | | B26B 21/443 30/29.5 |
| 6,401,342 B1 * | 6/2002 | Kloss | | B26B 7/00 30/277.4 |
| 6,678,959 B1 * | 1/2004 | Phillip | | B28D 1/06 451/356 |
| 6,722,042 B1 * | 4/2004 | Naville, Jr. | | B26B 5/00 30/280 |
| 6,802,127 B2 | 10/2004 | Thomaschewski | | B26B 7/00 30/277.4 |
| 6,968,624 B1 * | 11/2005 | Peters | | A47J 9/002 30/113.1 |
| 7,080,454 B2 * | 7/2006 | Holcomb | | A47J 17/02 30/302 |
| 7,421,786 B2 * | 9/2008 | Dorion | | A47J 17/02 30/302 |
| 7,458,163 B2 * | 12/2008 | Teich | | A47J 43/288 15/236.08 |
| D605,911 S * | 12/2009 | Lian | | D8/14 |
| D682,632 S * | 5/2013 | Krus | | D7/693 |
| D691,002 S * | 10/2013 | Zemel | | D7/696 |
| D702,513 S * | 4/2014 | Harris | | D7/682 |
| D721,253 S * | 1/2015 | Kent | | D7/696 |
| 9,027,452 B2 * | 5/2015 | Nagy | | B23D 61/006 30/348 |
| 9,089,983 B1 * | 7/2015 | Waddell | | B26B 27/00 |
| 9,636,833 B1 * | 5/2017 | Brucker | | A21C 15/00 |
| D811,830 S * | 3/2018 | Khubani | | D7/696 |
| 10,098,357 B1 * | 10/2018 | Nasar | | A23P 20/25 |
| D928,569 S * | 8/2021 | Caplan | | D7/693 |
| 2003/0226263 A1 * | 12/2003 | Fedor | | B26B 3/00 30/142 |
| 2004/0078984 A1 * | 4/2004 | Glodowski | | B26B 5/00 30/313 |
| 2004/0139617 A1 * | 7/2004 | Neshat | | A22C 25/185 30/355 |
| 2004/0158995 A1 * | 8/2004 | Dunn-Rankin | | B26B 9/02 30/355 |
| 2004/0187314 A1 * | 9/2004 | Johnson | | B26B 5/00 30/162 |
| 2004/0216308 A1 * | 11/2004 | Bertulis | | B26B 3/00 30/316 |
| 2005/0198836 A1 * | 9/2005 | Thiele | | B26B 7/005 30/277.4 |
| 2006/0009796 A1 * | 1/2006 | Carusillo | | B27B 19/006 606/178 |
| 2006/0169120 A1 * | 8/2006 | Smith | | B26B 21/56 83/835 |
| 2007/0039445 A1 * | 2/2007 | Nitsch | | B26B 9/02 83/835 |
| 2009/0056145 A1 * | 3/2009 | Alfi | | B26B 29/02 30/151 |
| 2009/0165233 A1 * | 7/2009 | Hagemann | | A46B 5/02 15/143.1 |
| 2010/0077890 A1 * | 4/2010 | Neiser | | B26B 27/005 81/3.55 |
| 2011/0094112 A1 * | 4/2011 | Patterson | | B26B 9/00 30/355 |
| 2012/0304472 A1 * | 12/2012 | Medhurst | | B26B 5/001 30/162 |
| 2013/0167382 A1 * | 7/2013 | Maras | | B26B 9/02 30/356 |
| 2016/0324060 A1 * | 11/2016 | Pope | | A01D 7/00 |

\* cited by examiner

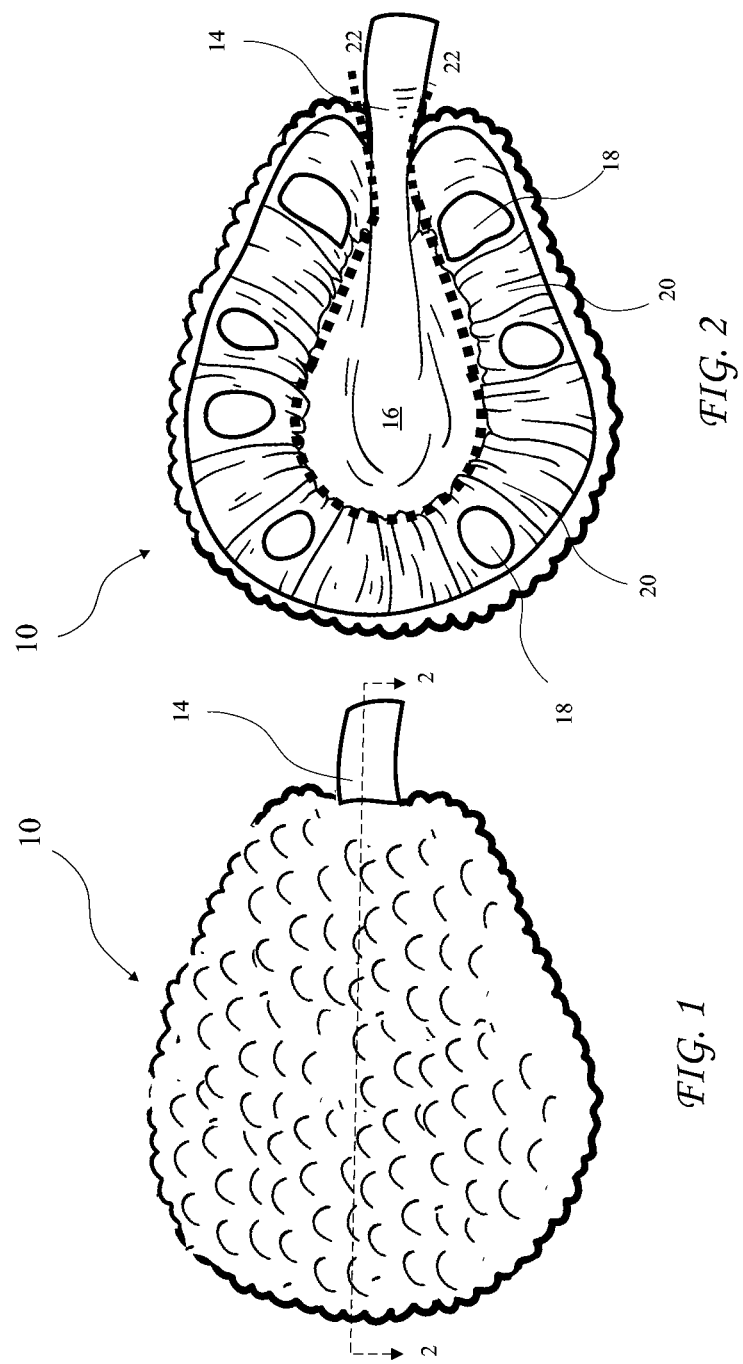

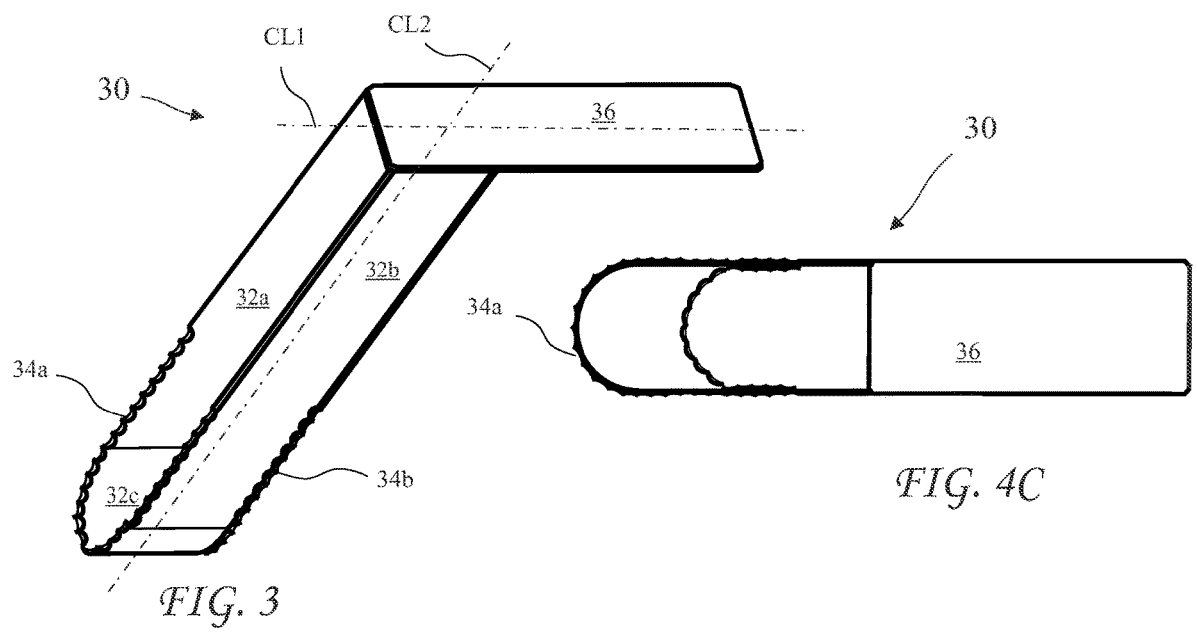
FIG. 3
FIG. 4C
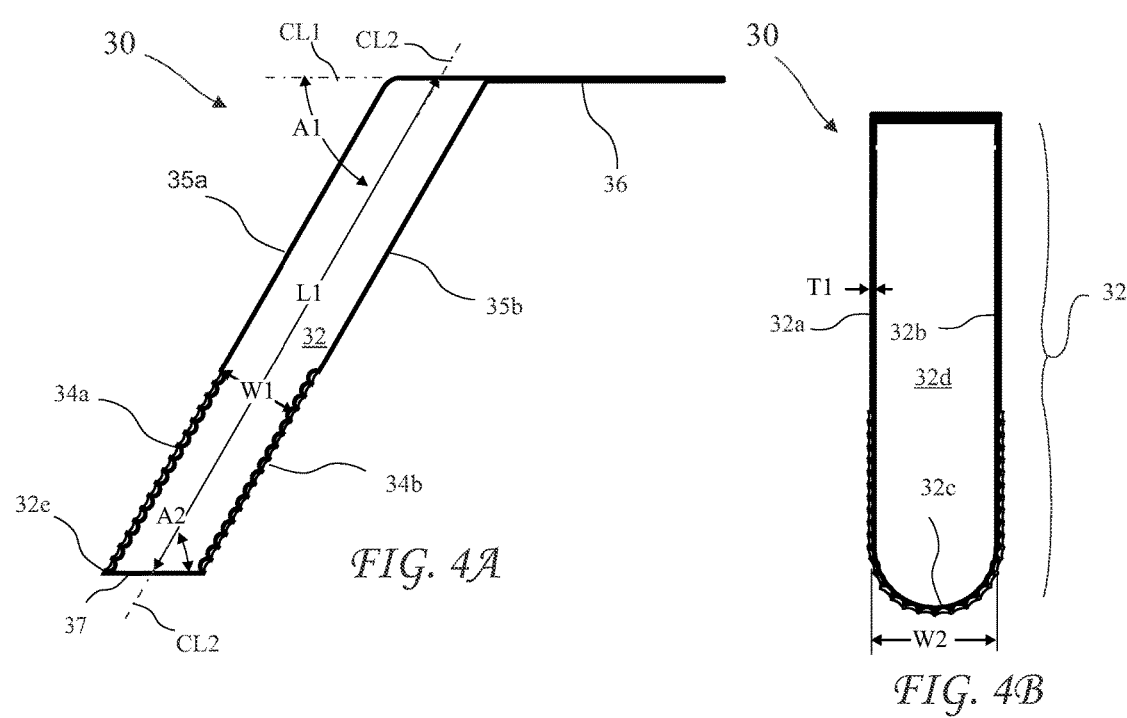
FIG. 4A
FIG. 4B

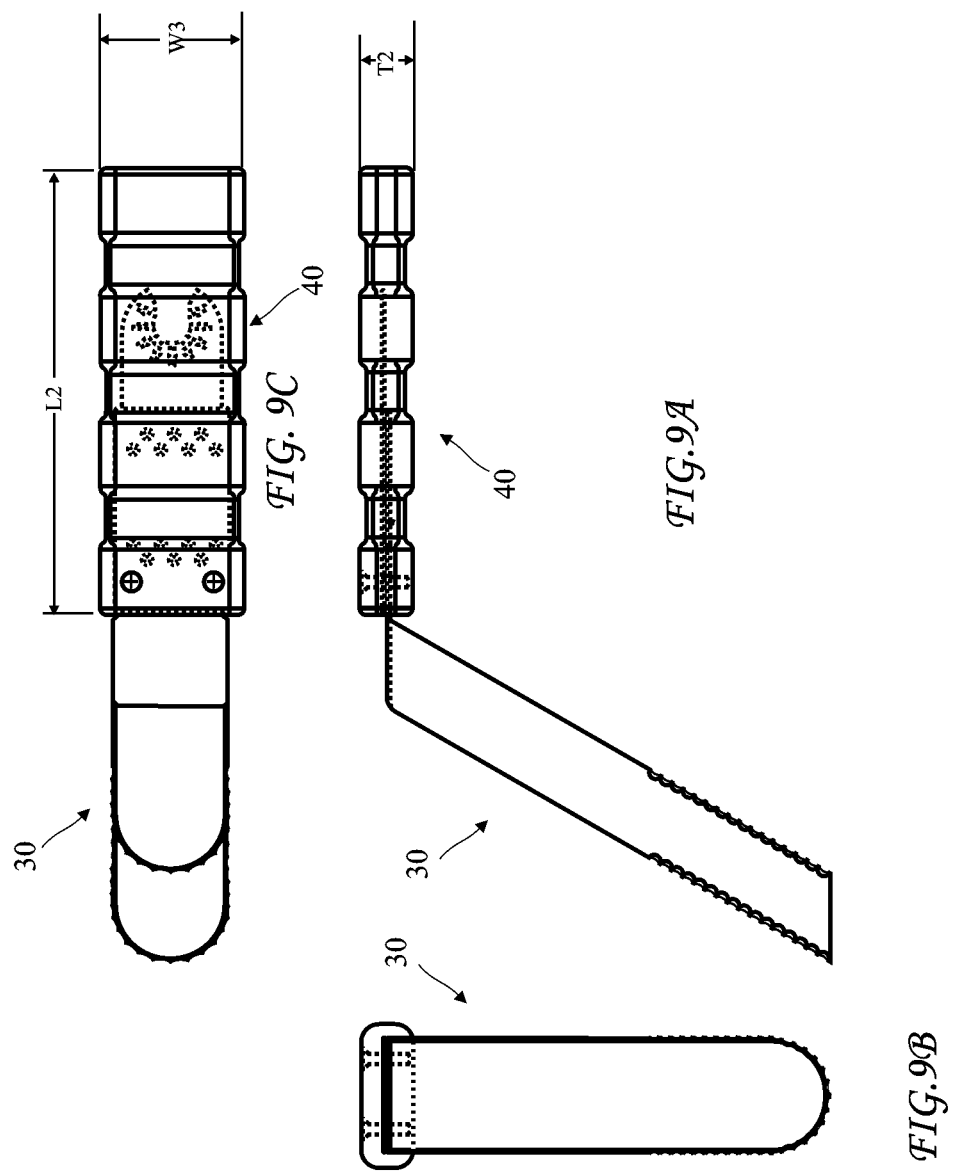

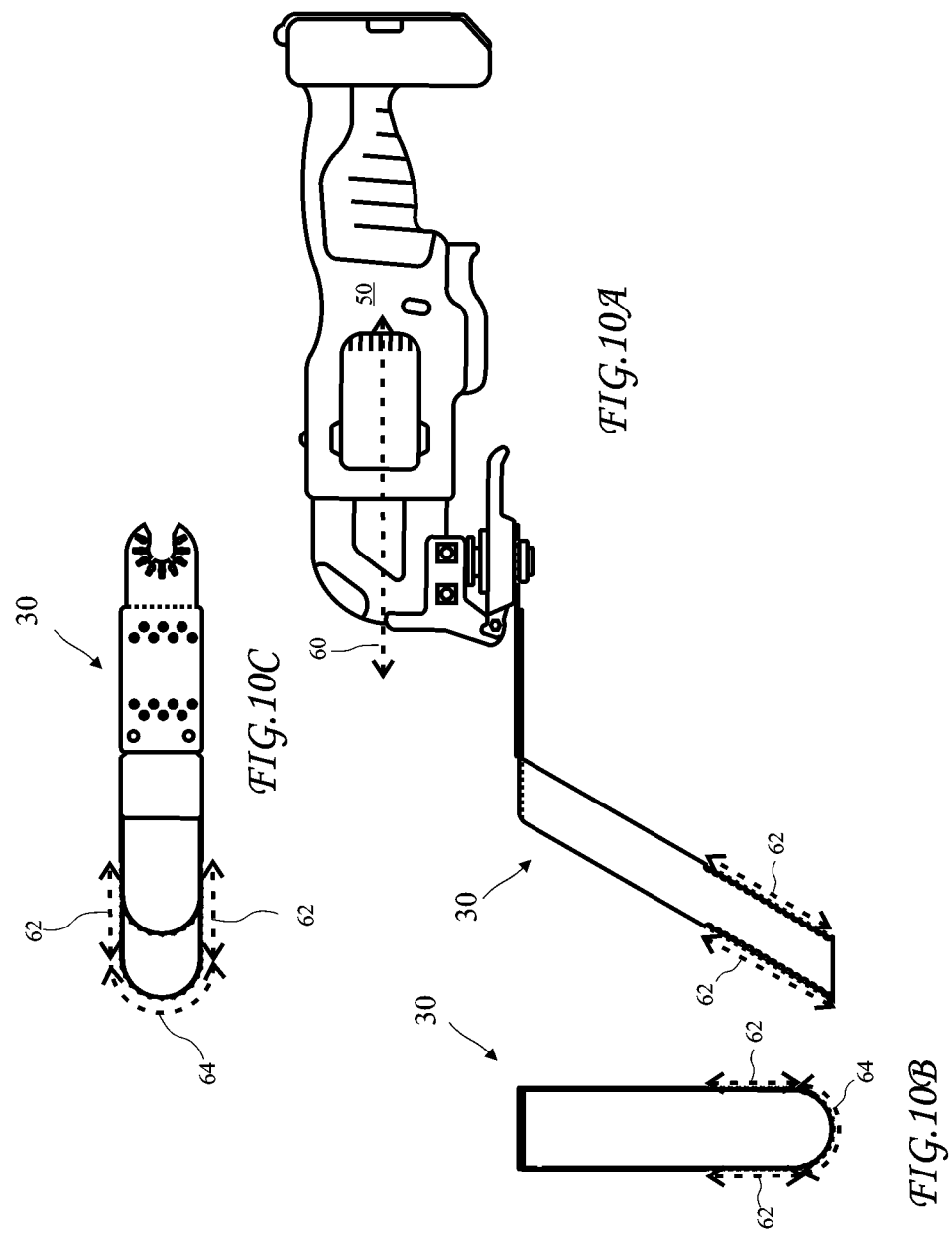

SERRATED JACKFRUIT KNIFE

BACKGROUND OF THE INVENTION

The present invention relates to removing the sticky latex core of jackfruit and in particular to a tool well suited for removing the jackfruit core.

Jackfruit is a large tropical fruit that grows on a tree known as a jack tree (or jackfruit tree), is part of the same botanical family (Moracaea) as the fig and breadfruit. For centuries jackfruit was consumed mostly in India, Bangladesh, and Sri Lanka, but in recent years jackfruit has become more popular and widely known across the globe as a vegetarian meat substitute, thanks to jackfruit's ability to imitate the texture of meat and offer a real nutritional value at a competitive cost. Jackfruit tastes sweet, similar to a combination of a mango (though more mellow), a pineapple, and an overripe banana.

While most jackfruit is grown in Asia and South America (and consumed locally or processed and shipped around the world), the jackfruit tree can thrive in Hawaii and South Florida, as well as around the Caribbean. Jackfruit is commonly prepared by: 1) cutting the jackfruit in half; 2) using a conventional knife to cut around and then under the core and stem; 3) removing the core and stem; and 4) cutting out the edible portion.

Because jackfruit is heavy, hard to cut, and sticky, using a conventional knife to cut around and then under the core and stem can be difficult. As a result, many consumers opt for the canned flesh instead of fresh jackfruit.

BRIEF SUMMARY OF THE INVENTION

The present invention addresses the above and other needs by providing a jackfruit knife having a blade with generally parallel sides connected at a rounded end. Serrations are present on opposite edges of the blade sides and the rounded end. The blade may be attached to a handle for manual operation, or to an oscillating tool. The motion provided by the oscillating tool reduces or prevents the blade from sticking while cutting into the jackfruit core.

In accordance with one aspect of the invention, there is provided

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a jackfruit.

FIG. 2 shows a cross-sectional view of the jackfruit taken along line 2-2 of FIG. 1.

FIG. 3 shows an isometric view of a jackfruit knife blade according to the present invention.

FIG. 4A shows a side view of the jackfruit knife blade according to the present invention.

FIG. 4B shows a front view of the jackfruit knife blade according to the present invention.

FIG. 4C shows a top view of the jackfruit knife blade according to the present invention.

FIG. 9A shows a dimensioned side view of the jackfruit knife blade, according to the present invention.

FIG. 9B shows a dimensioned front view of the jackfruit knife blade, according to the present invention.

FIG. 9C shows a dimensioned top view of the jackfruit knife blade, according to the present invention.

FIG. 10A shows a side view of motion of the jackfruit knife blade attached to the oscillating tool, according to the present invention.

FIG. 10B shows a front view of the motion of the jackfruit knife blade attached to the oscillating tool, according to the present invention.

FIG. 10C shows a top view of the motion of the jackfruit knife blade attached to the oscillating tool, according to the present invention.

Corresponding reference characters indicate corresponding components throughout the several views of the drawings.

DETAILED DESCRIPTION OF THE INVENTION

Figures 5, 6:
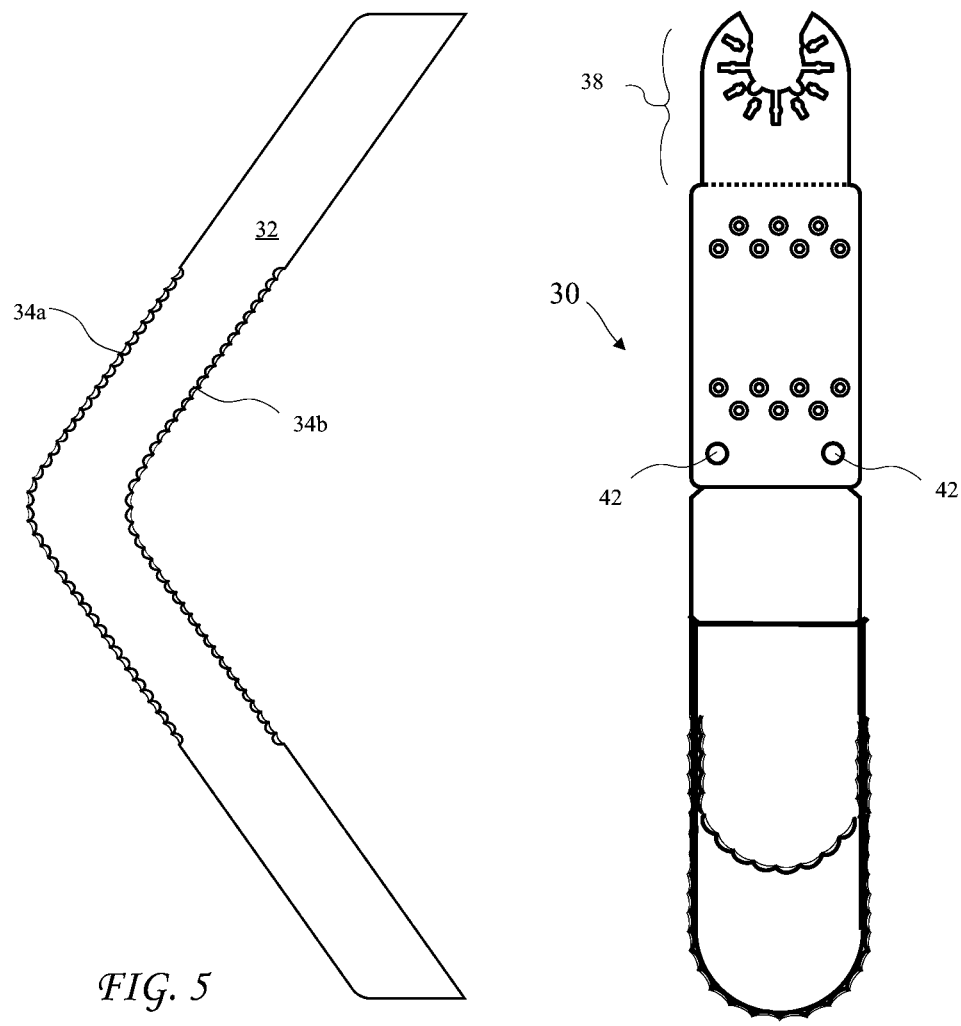
FIG. 5 shows the jackfruit knife blade before bending into a "U" shape, according to the present invention.
FIG. 6 shows the jackfruit knife blade adapted for attachment to a handle or to an oscillating tool, according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

A jackfruit 10 is shown in prior art FIG. 1 and a cross-sectional view of the jackfruit 10 taken along line 2-2 of FIG. 1 is shown in FIG. 2. The jackfruit includes a stem 14, core 16, seeds 18, and arlis 20. The arlis 20 is an edible seed coat or flesh, which has an intense sweet taste at maturity of the jackfruit. The core 16 is preferably cut and removed along dashed line 22 to prepare the jackfruit 10 for eating.

An isometric view of a jackfruit knife blade 30 according to the present invention is shown in FIG. 3, a side view of the jackfruit knife blade 30 is shown in FIG. 4A, a front view of the jackfruit knife blade 30 is shown in FIG. 4B, and a top view of the jackfruit knife blade 30 is shown in FIG. 4C. The blade 30 includes a handle or attaching portion 36 having a first longitudinal centerline CL1 attached to a cutting portion 32 having a second longitudinal centerline CL2. The cutting portion 32 includes two generally straight and generally parallel sides 32a and 32b, and a closed or rounded end 32c opposite to the handle or attaching portion 36. The cutting portions 32a, 32b, and 32c further include serrations 34a on a front edge 35a, and serrations 34b on a rear edge 35b. The serrations 34a and 34b are preferably on bottom halves of the generally parallel sides 32a and 32b and on the rounded end 32c. In the side view of FIG. 4A, a blade end 37 of the closed or rounded end 32c (see FIG. 3) is angled by an acute angle A2 away from the centerline CL2 of the cutting portion 32 providing a point 32e of the front edge 35a of the cutting portion 32.

The cutting portion 32 is preferably angled down (away from straight) from the attaching portion 36 at a first angle A1 between the longitudinal centerline CL1 and the longitudinal centerline CL2 (see FIG. 3), has a length L1, a first width W1 between serrated edges 34a and 34b, a second width W2 between sides 32a and 32b, and a thickness T1. The angle A1 may be zero degrees but is preferably between 45 and 90 degree, and more preferably is about 60 degrees, and most preferably is 60 degrees. The length L1 is preferably between 150 and 200 mm, and more preferably is about 175 mm, and most preferably is 175 mm. The width W1 is preferably between 40 and 70 mm, and more preferably is about 40 mm, and most preferably is 40 mm. The width W2 is preferably between 40 and 70 mm, and more preferably is about 40 mm, and most preferably is 40 mm. The thickness T1 is preferably between 1.5 and 3 mm, and more preferably is about 2 mm, and most preferably is 2 mm. A continuous unobstructed opening 32d resides between the two generally parallel sides 32a and 32b, the closed or rounded end 32c preferably convex and reaching out from the continuous unobstructed opening 32d.

FIG. 5 shows the jackfruit knife blade before bending into a "U" shape having a "V" shape.

The cutting portion 32 of the jackfruit knife blade 30 before bending into a "U" shape is shown ion FIG. 5.

The jackfruit knife blade 30 adapted for attachment to a handle 40 or to an oscillating tool 50 is shown in FIG. 6. The jackfruit knife blade 30 includes a oscillating tool pattern 38 common to oscillating tool blades. Passages 42 are provided as an example of attaching features of a handle 40 (see FIG. 7), but a jackfruit knife blade 30 described above may be attached to a handle in various ways and a jackfruit knife blade 30 attached by any method to a handle 40 or oscillating tool 50 is intended to come within the scope of the present invention.

Figure 7:
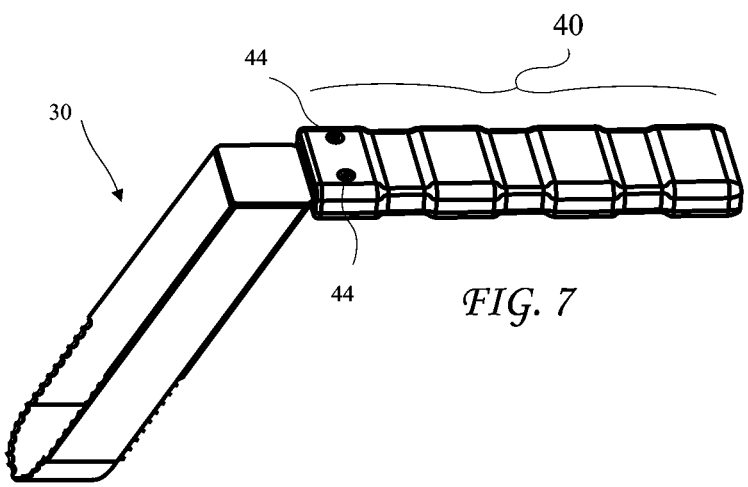
FIG. 7 shows the jackfruit knife blade attached to a handle, according to the present invention.

FIG. 7 shows the jackfruit knife blade 30 attached to the handle 40. Fasteners 44 may engage passages 42 (see FIG. 6) to retain the handle 40 on the attaching portion 36 of the jackfruit knife blade 30.

Figure 8:
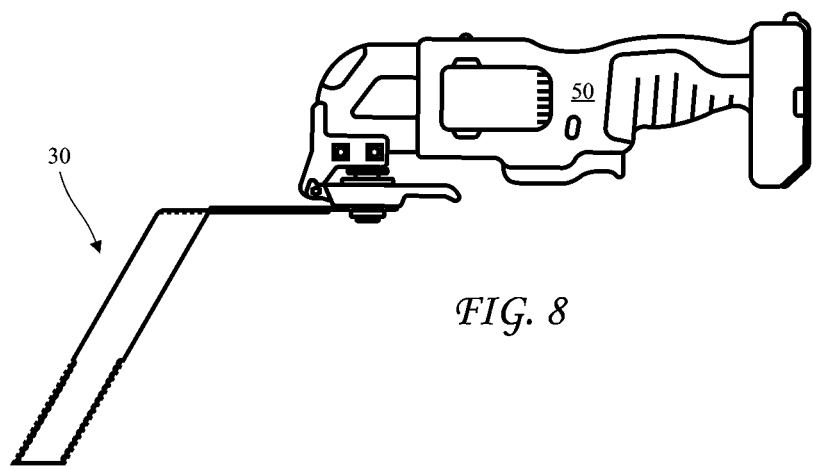
FIG. 8 shows the jackfruit knife blade according to the present invention, attached to the oscillating tool.

The jackfruit knife blade 30 attached to the oscillating tool 50 is shown in FIG. 8. The jackfruit knife blade 30 is attached to the oscillating tool 50 using the oscillating tool pattern 38.

A dimensioned side view of the jackfruit knife blade 30 attached to the handle is shown in FIG. 9A, a front view of the jackfruit knife blade 30 is shown in FIG. 9B, and a dimensioned top view of the jackfruit knife blade 30 is shown in FIG. 9C. The handle 40 has a length L2, a width W3, and a thickness T2. The length L2 is preferably between 120 and 160 mm, and more preferably is about 150 mm, and most preferably is 150 mm. The width W3 is preferably between 40 and 60 mm, and more preferably is about 50 mm, and most preferably is 50 mm. The thickness T2 is preferably between 15 and 25 mm, and more preferably is about 20 mm, and most preferably is 20 mm.

A side view of motion of the jackfruit knife blade 30 attached to the oscillating tool 50 is shown in FIG. 10A, a front view of the motion of the jackfruit knife blade 30 attached to the oscillating tool 50 is shown in FIG. 10B, and a top view of the motion of the jackfruit knife blade 30 attached to the oscillating tool 50 is shown in FIG. 10C. A user may provide a macro motion 60 of the oscillating tool 50 which is coupled through the oscillating tool 50 to the jackfruit knife blade 30, and the oscillating tool 50 provides linear micro motion 62 and rotational micro motion 64 to the jackfruit knife blade 30. The micro motion 62 and 64 reduces or eliminates sticking of the jackfruit knife blade 30 in the core 16 of the jackfruit 10 and makes cutting out the jackfruit 10 core 16 easier.

While the invention herein disclosed has been described by means of specific embodiments and applications thereof, numerous modifications and variations could be made thereto by those skilled in the art without departing from the scope of the invention set forth in the claims.

I claim:

1. A jackfruit cutting tool comprising:
   a blade configured to mount to an oscillating tool drive having:
      an attaching portion having a first longitudinal centerline (CL1);
      a cutting portion extending from the attaching portion having a second longitudinal centerline (CL2), the cutting portion including:
         two generally straight and generally parallel sides reaching from the attaching portion;
         a closed end connecting ends of the two generally straight and generally parallel sides of the cutting portion, the closed end opposite to the attaching portion;
         wherein each of the straight and parallel sides includes a leading edge directed forward with respect to the attaching portion and a trailing edge directed rearward towards the attaching portion;
         in a side view, a blade end of the closed end is angled by an acute angle (A2) away from the second longitudinal centerline (CL2) of the cutting portion providing a point of a front edge of the cutting portion; and
         the two generally straight and generally parallel sides have serrations on each of their leading and trailing edges; and
      wherein the attaching portion includes a flat attaching portion symmetrical about the first longitudinal centerline including a pattern of at least three indentations including one indentation aligned with the centerline (CL1) and at least two indentations laterally spaced relative to the centerline (CL1) and the attaching portion adapted to releasably receive an oscillating tool drive shaft.

2. The tool of claim 1, wherein:
   the closed end includes a closed end front edge opposite to a closed edge rear end; and
   end serrations reside on both of the closed end front edge and the closed end rear edge.

3. The tool of claim 2, wherein the closed end is a rounded end, rounded away from the attaching portion.

4. The tool of claim 1, wherein:
   the second longitudinal centerline (CL2) of the two generally straight and generally parallel sides is angularly offset down from the first longitudinal centerline (CL1) of the attaching portion by an angle A1.

5. The tool of claim 4, wherein the second longitudinal centerline (CL2) of the two generally straight and generally parallel sides is offset from the first longitudinal centerline (CL1) of the attaching portion by the angle (A1) angling down between 45 and 90 degrees.

6. The tool of claim 5, wherein the two generally straight and generally parallel sides are angularly offset from the attaching portion by the angle A1 angling down about 60 degrees.

7. The tool of claim 1, wherein the two generally straight and generally parallel sides are separated by between 40 and 70 mm.

8. The tool of claim 7, wherein the two generally straight and generally parallel sides are separated by about 40 mm.

9. The tool of claim 1, wherein the two generally straight and generally parallel sides are between 1.5 and 3 mm thick.

10. The tool of claim 9, wherein the two generally straight and generally parallel sides are about 2 mm thick.

11. The tool of claim 1, wherein the two generally straight and generally parallel sides are between 40 and 70 mm wide.

12. The tool of claim 11, wherein the two generally straight and generally parallel sides are about 40 mm wide.

13. The tool of claim 1, wherein the two generally straight and generally parallel sides having a length between 150 and 200 mm.

14. The tool of claim 13, wherein the two generally straight and generally parallel sides having a length of about 175 mm.

15. The tool of claim 1, further including a continuous permanently unobstructed opening between the two generally straight and generally parallel sides and between the attaching portion and the closed end.

16. The tool of claim 15, wherein the cutting portion, before bending into a "U" shape, describes a "V" shape.

17. A jackfruit cutting tool comprising: a blade configured to mount to an oscillating tool drive having:
an attaching portion;
a cutting portion extending from the attaching portion and including:
two generally straight and generally parallel sides reaching from the attaching portion, wherein the two generally straight and generally parallel sides include:
serrations on opposite edges;
are angled down at between 45 and 90 degrees from the handle portion;
a length between 150 and 200 mm;
a width between 40 and 70 mm;
thickness between 1.5 and 3 mm;
a separation of between 40 and 70 mm;
a rounded end opposite to the attaching portion connecting the two generally straight and generally parallel sides wherein each of the straight and parallel sides includes a leading edge directed forward with respect to the attaching portion and a trailing edge directed rearward towards the attaching portion;
the rounded end rounded away from the handle portion; and
in a side view, a blade end of the rounded end of the cutting portion is angled by an acute angle (A2) away from a second longitudinal centerline (CL2) of the cutting portion providing a point of a front edge of the cutting portion, and the two generally straight and generally parallel sides have serrations on each of their leading and trailing edges; and wherein the attaching portion includes a flat attaching portion symmetrical about the first longitudinal centerline including a pattern of at least three indentations including one indentation aligned with the centerline (CL1) and at least two indentations laterally spaced relative to the centerline (CL1) and the attaching portion adapted to releasably receive an oscillating tool drive shaft.

18. A jackfruit cutting tool comprising:
a blade configured to mount to an oscillating tool drive, the blade having:
an attaching portion having an oscillating tool pattern common to oscillating tool blades configured connect the attaching portion to an oscillating tool;
a cutting portion comprising:
two generally straight and generally parallel sides reaching from the attaching portion end, wherein each of the straight and parallel sides includes a leading edge directed forward with respect to the attaching portion and a trailing edge directed rearward towards the attaching portion; and
wherein the two generally straight and parallel sides include:
an angle down of 60 degrees from the handle end;
a length of 175 mm;
a width of 40 mm;
a separation of 40 mm;
a thickness of 2 mm;
a closed end opposite to the attaching portion and connecting the two generally straight and generally parallel sides; and
in a side view, a blade end the closed end is angled by an acute angle (A2) away from a second longitudinal centerline (CL2) of the cutting portion providing a point of a front edge of the cutting portion, and the two generally straight and generally parallel sides have serrations on each of their leading and trailing edges; and
wherein the attaching portion includes a flat attaching portion symmetrical about the first longitudinal centerline including a pattern of at least three indentations including one indentation aligned with the centerline (CL1) and at least two indentations laterally spaced relative to the centerline (CL1) and the attaching portion adapted to releasably receive an oscillating tool drive shaft.

\* \* \* \* \*